Sept. 3, 1946.  G. LIVELY  2,406,783
BICYCLE SEAT
Filed June 19, 1944  2 Sheets-Sheet 1
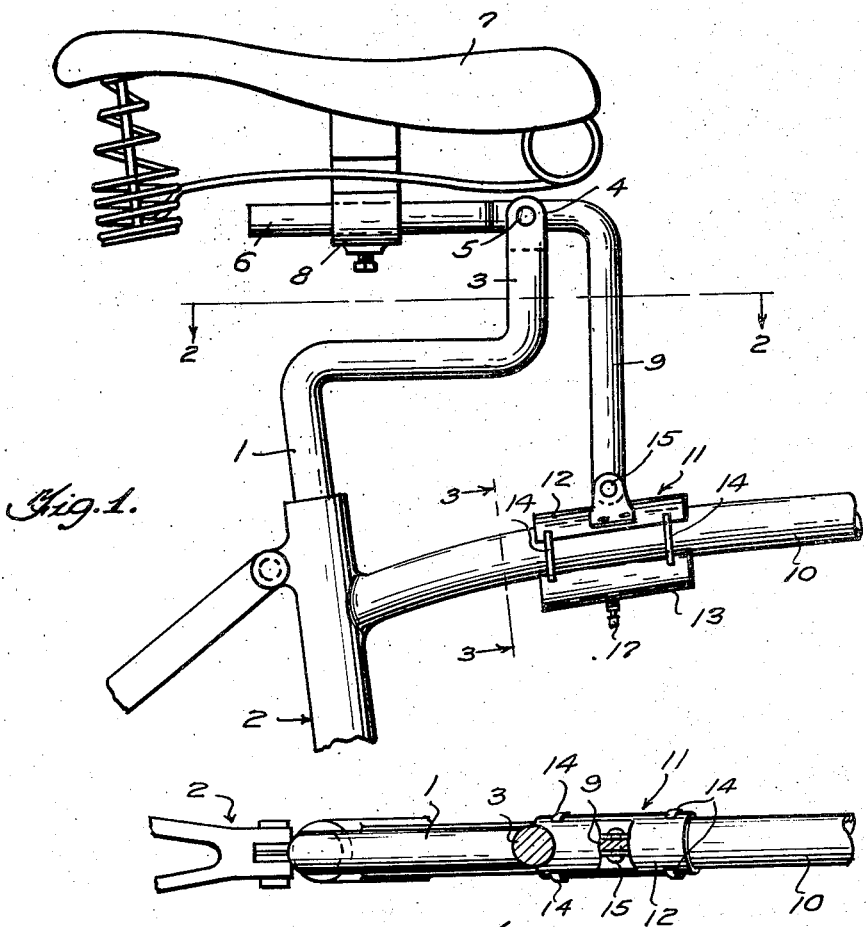
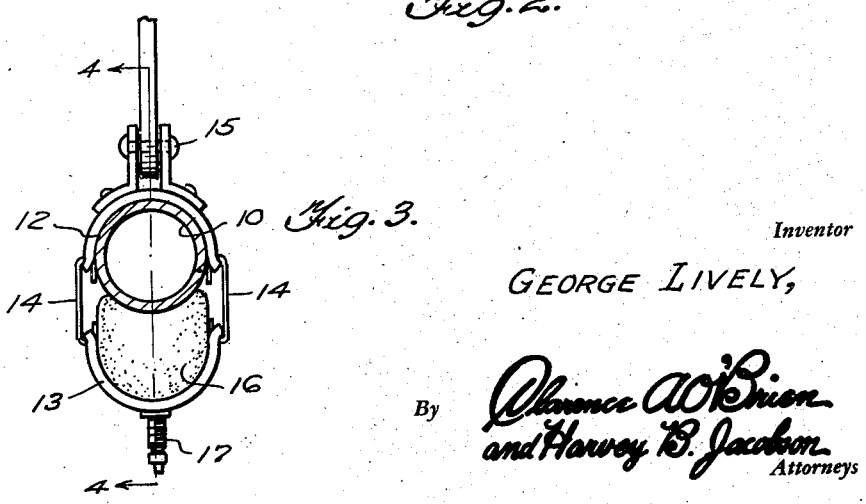
Inventor
GEORGE LIVELY,
By Clarence A. O'Brien
and Harvey B. Jackson
Attorneys Sept. 3, 1946.  G. LIVELY  2,406,783
BICYCLE SEAT
Filed June 19, 1944  2 Sheets-Sheet 2

Inventor
GEORGE LIVELY,
By Clarence A. O'Brien
and Harvey B. Jacobson
Attorneys

Patented Sept. 3, 1946

2,406,783

UNITED STATES PATENT OFFICE 2,406,783

BICYCLE SEAT

George Lively, Pueblo, Colo.

Application June 19, 1944, Serial No. 540,910

2 Claims. (Cl. 155—5.20)

The present invention relates to new and useful improvements in bicycle seats, and has for its primary object to provide a device of this character comprising pneumatic cushioning means of a novel construction and arrangement.

Other objects of the invention are to provide a pneumatically cushioned bicycle seat of the aforementioned character which will be comparatively simple in construction, strong, durable, compact, light in weight and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:

Figure 1 is a view in side elevation of a bicycle seat constructed in accordance with the present invention.

Figure 2 is a view in horizontal section, taken substantially on the line 2—2 of Figure 1.

Figure 3 is a view in transverse section, taken substantially on the line 3—3 of Figure 1.

Figure 4:
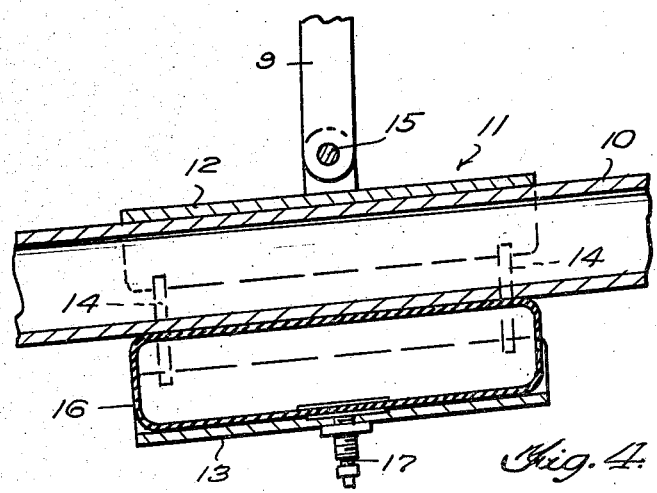
Figure 4 is a view in vertical longitudinal section, taken substantially on the line 4—4 of Figure 3.

Referring now to the drawings in detail, it will be seen that reference character 1 designates a post which may be secured in the usual manner in the frame 2 of a bicycle. The post 1 includes a forwardly offset upper end portion 3 which terminates in bifurcations 4.

Journaled on a pin 5 between the bifurcations 4 of the posts 1 is an angular lever 6. A saddle 7 is mounted for longitudinal adjustment on the substantially horizontal upper portion of the lever 6 through the medium of a suitable clamp 8. The angular lever 6 includes a depending forward portion 9 which is connected to the usual top bar 10 of the bicycle frame 2 through the medium of a yieldable clamp 11.

As illustrated to advantage in Figures 3 and 4 of the drawings, the yieldable clamp 11 includes substantially channel-shaped upper and lower saddles 12 and 13, respectively, of suitable strong, flexible material, which are connected by links 14. The saddle 12, which is mounted on the frame bar 10, is pivotally secured at 15 to the lower end portion 9 of the lever 6. The saddle 13 is spaced below the frame bar 10 for receiving therebetween an inflated cushion 16. A depending inflating valve 17 is provided for the pneumatic cushion 16, said valve passing downwardly through an opening provided therefor in the saddle 13.

It is thought that the operation of the invention will be readily apparent from a consideration of the foregoing. Briefly, the pneumatic cushion 16 is inflated to the desired pressure. The seat 7 is secured in adjusted position on the horizontal upper portion of the lever 6. As the seat 7 moves downwardly under the load thereon, the pneumatic cushion 16 is compressed between the saddle 13 and the bar 10 of the bicycle frame 2. In this manner the cushion 16 functions as a shock absorber in addition to yieldingly supporting the rider at all times. This cushioning and shock absorbing effect may be adjusted as desired by regulating the pneumatic pressure in the cushion 16, also by moving the seat 7 forwardly or rearwardly on the lever 6. Of course, the lever 6 swings vertically on the post 1.

Figure 5:
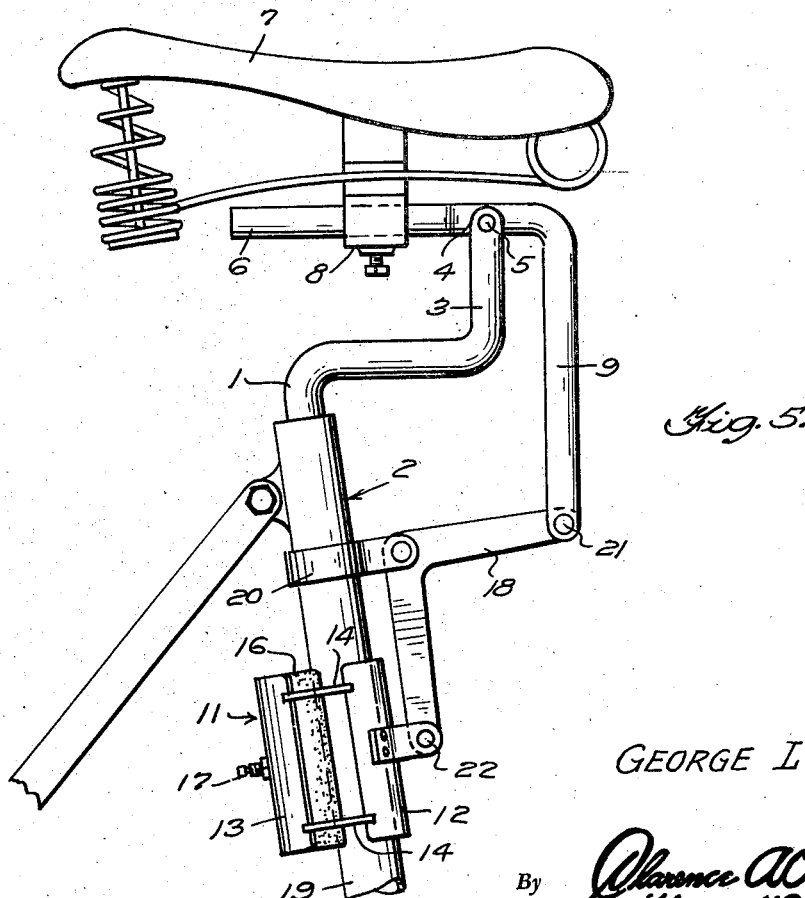
Figure 5 is a view in side elevation of a modification.

The modification illustrated in Figure 5 of the drawings is for use on bicycle frames which do not comprise the bar 10, such as those which are particularly for women. In this embodiment, a bell crank lever 18 is pivotally secured on the upper portion of the member 19 of the bicycle frame through the medium of a suitable clamp 20. One end of the bell crank lever 18 is pivotally connected at 21 to the lower end portion 9 of the lever 6. The other end of the bell crank lever 18 is pivotally connected at 22 to the saddle 12 of the yieldable clamp 11. In other respects, this form of the invention is substantially similar in construction and operation to the embodiment shown in Figures 1 to 4, inclusive, of the drawings.

It is believed that the many advantages of a bicycle seat constructed in accordance with the present invention will be readily understood, and although preferred embodiments of the device are as illustrated and described, it is to be understood that further modifications and changes in the details of construction may be resorted to which will fall within the scope of the invention as claimed.

What is claimed is:

1. In a bicycle comprising a frame including a substantially horizontal bar, a post mounted on the frame and including a forwardly offset upper end portion, an angular lever pivotally mounted at an intermediate point for vertical swinging movement on said upper end portion of the post, a seat adjustably mounted on one end portion of the lever, the other end portion of said lever terminating adjacent said bar, a saddle pivotally mounted on said other end portion of the lever and engaged on top of the bar, a saddle suspended from the first-named saddle in spaced relation below the bar, and an inflated cushion mounted in the second-named saddle and engaged beneath the bar.

2. In a bicycle including a frame, a post mounted on said frame and having a forwardly offset upper end portion, a right angled lever having a horizontal arm pivotally mounted at an intermediate point for vertical swinging movement on said end portion of said post, said lever having a depending front arm, a seat mounted on said horizontal arm of the lever rearwardly of the pivot of said horizontal arm, and a clamp yieldably connecting the lower end of the depending arm to a member of the frame, said clamp including opposed substantially channel-shaped upper and lower saddles above and below the frame member, the lower saddle being spaced from said frame member, links connecting the saddles, and a pneumatic cushion between the lower saddle and said frame member.

GEORGE LIVELY.